United States Patent [19]

Peters et al.

[11] Patent Number: 4,824,158

[45] Date of Patent: Apr. 25, 1989

[54] COMBINATION ACCESS BOX AND BED LINER FOR VEHICLES

[76] Inventors: Richard E. Peters; Larry J. Parlette, both of 2627 SE. Holgate, Portland, Oreg. 97202

[21] Appl. No.: 76,943

[22] Filed: Jul. 23, 1987

[51] Int. Cl.⁴ .............................................. B60R 5/00
[52] U.S. Cl. ................................ 296/37.6; 312/341 R; 312/348; 108/44; 414/522
[58] Field of Search .................. 312/348, 341; 384/18, 384/19, 20, 21; 296/37.6, 37.1, 26; 414/522; 292/341.18, 341.19, 341.17; 126/339, 333; 108/44

[56] References Cited

U.S. PATENT DOCUMENTS

| | | | |
|---|---|---|---|
| 353,640 | 11/1886 | Nourse | 312/341 R |
| 1,285,708 | 11/1918 | Hormes | 312/348 |
| 2,576,385 | 11/1951 | Bigsby | 224/42.44 |
| 2,784,027 | 3/1957 | Temp | 296/156 |
| 2,852,303 | 9/1958 | Hopson | 296/26 |
| 3,224,805 | 12/1965 | Clyatt | 296/10 |
| 3,381,835 | 5/1968 | Lee | 414/462 |
| 3,471,045 | 10/1969 | Panciocco | 414/522 |
| 3,700,301 | 10/1972 | Boeck | 312/333 |
| 4,113,293 | 9/1978 | Paquette | 292/341.18 |
| 4,216,986 | 8/1980 | McNinch et al. | 292/341.17 |
| 4,305,695 | 12/1981 | Zachrich | 414/522 |
| 4,367,906 | 1/1983 | Röck | 312/348 X |
| 4,375,306 | 3/1983 | Linder | 312/250 |
| 4,557,531 | 12/1985 | Röck et al. | 384/18 |
| 4,681,360 | 7/1987 | Peters et al. | 296/37.6 |
| 4,685,857 | 8/1987 | Goeser et al. | 414/522 |

Primary Examiner—Robert R. Song
Assistant Examiner—John M. Gruber
Attorney, Agent, or Firm—Eugene M. Eckelman

[57] ABSTRACT

A pair of support members are arranged for mounting on the floor of a vehicle cargo area and support a cargo box by rollers for movement between forward and rearward positions to provide easy access for loading and unloading the box at the rear of the cargo area. The support members and box have engaging latch portions providing latching notches for the box in forward, rearward and intermediate positions. Front and rear vertical axis rollers are provided on the box and support members, respectively, and have engagement with the other of the box and support members to provide a non-binding lateral stability. Also, longitudinally adjustable abutment means are provided to hold the box in a non-rattling forward latched position.

4 Claims, 2 Drawing Sheets

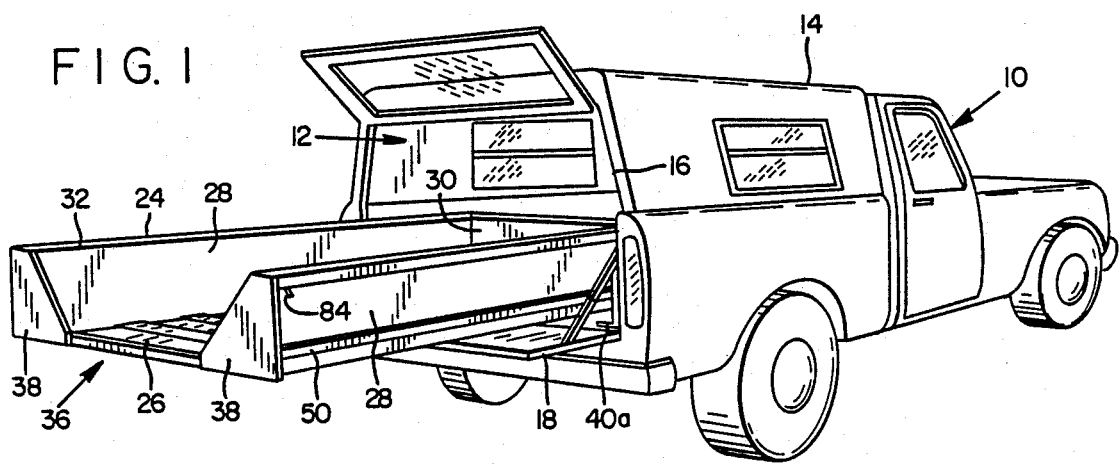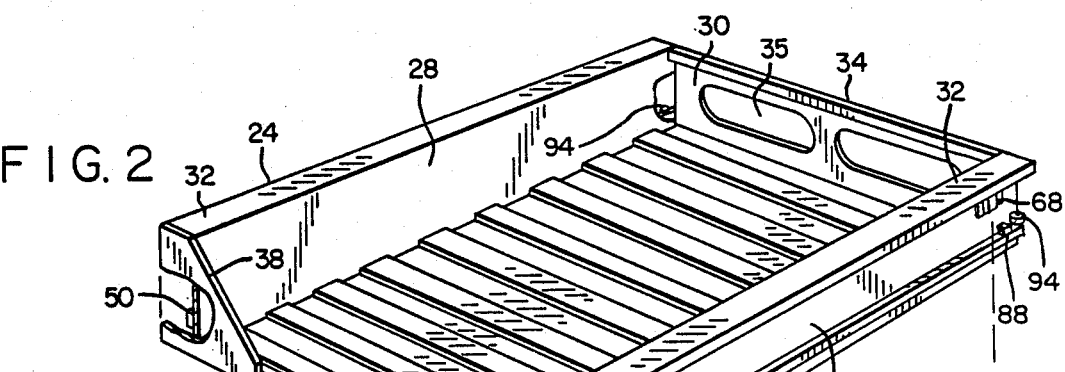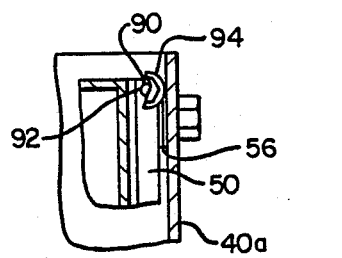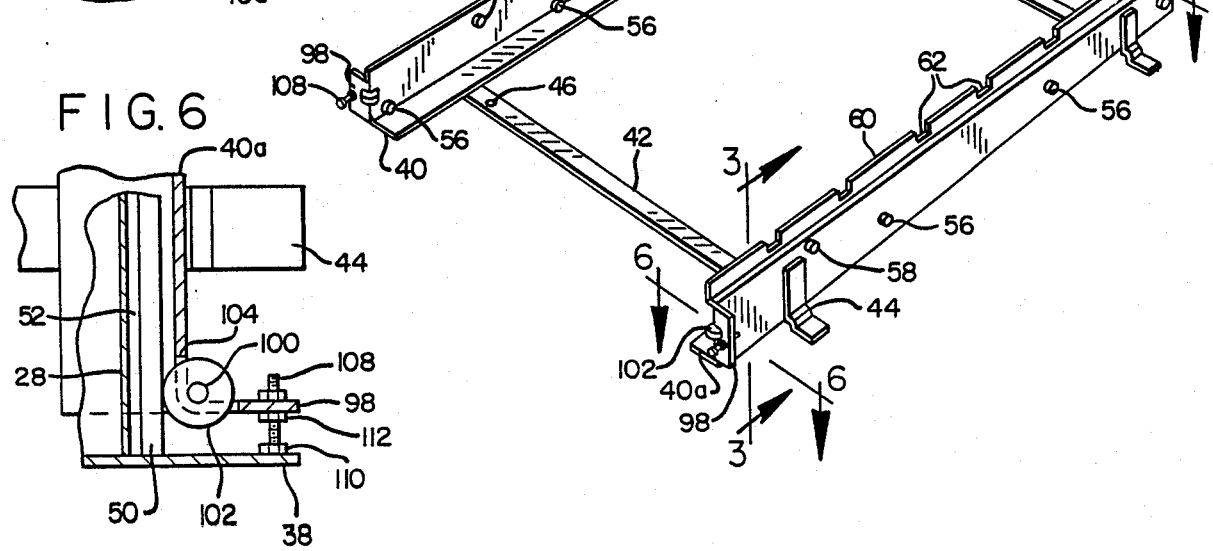

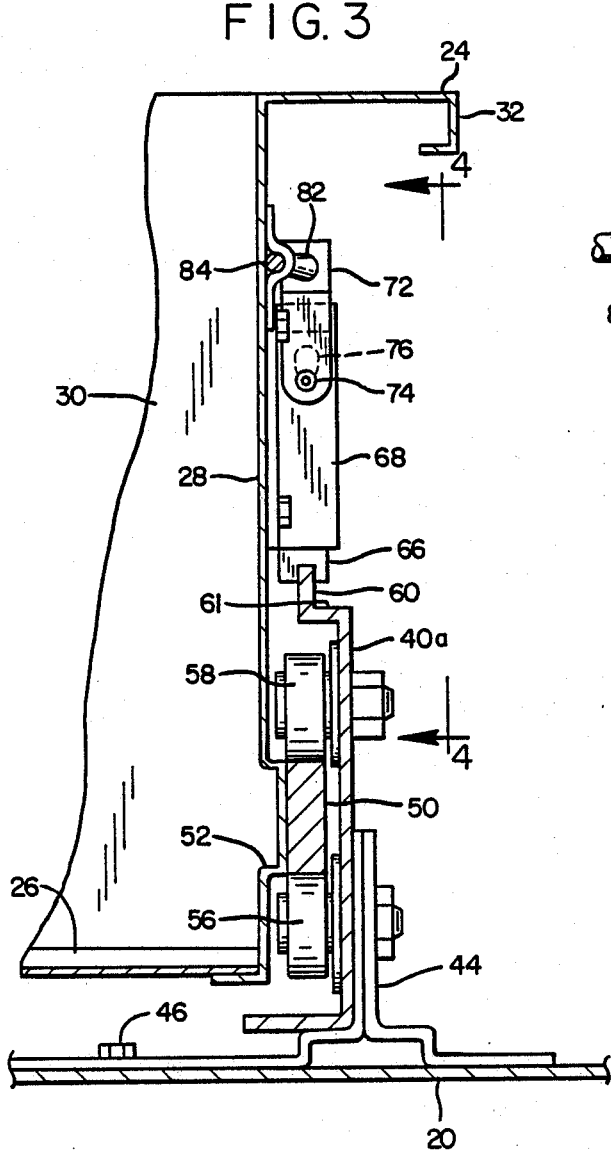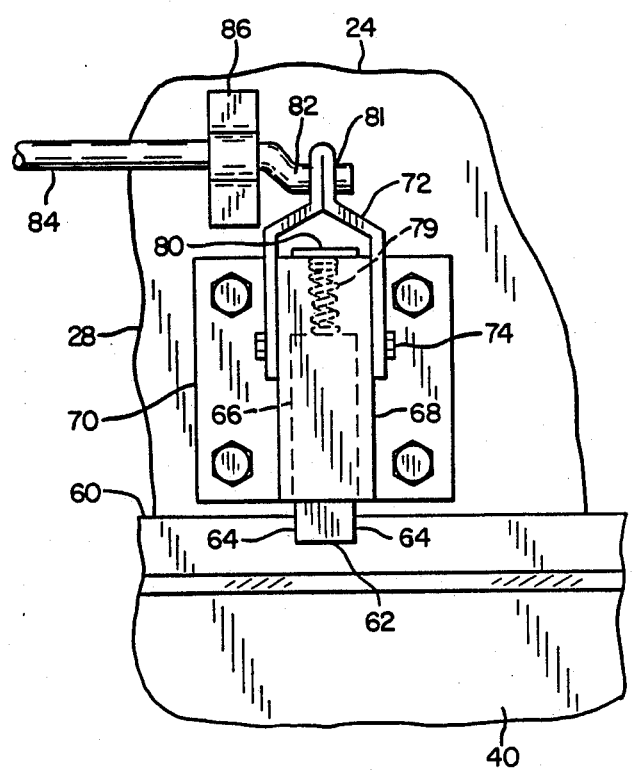

COMBINATION ACCESS BOX AND BED LINER FOR VEHICLES

BACKGROUND OF THE INVENTION

This invention relates to new and useful improvements in combination access boxes and bed liners for vehicles.

Various types of cargo vehicles such as pickups, vans, and the like have permanent or removable covers over the cargo area for protecting the cargo. Since this type of covered vehicle only has a rear opening, it is inconvenient to reach articles at the front of the cargo area. It is usually necessary to climb into the rear opening and work the articles rearward or to risk injury by leaning inward and picking up or pulling the articles rearward. The same applies in reverse, namely, when loading the vehicle.

Applicant has heretofore provided an improved structure which overcomes the difficulties of loading or reaching articles at the front of the cargo area. Such is illustrated in his U.S. Pat. No. 4,681,360. Such device provides a sturdy box which includes rail and roller means providing self support of the box in movable positions between a rearward access position and a forward loaded position. Since loads carried in such a box are frequently heavy, it is desired that the box be sturdy and capable of easy, non-binding manual movement between its forward and rearward positions, and vice versa. It is also desired that the box have a stable, non-rattling condition while in its forward loaded position so as to be quiet when the vehicle is in motion.

SUMMARY OF THE INVENTION

The present invention is concerned with improvements in access boxes of the type detailed in applicant's U.S. Pat. No. 4,681,360, and a first objective thereof is to provide lateral stabilizing rollers engageable between longitudinal support members and the box, thus laterally stabilizing the box against binding forces which may result from movement of the vehicle or parking of the vehicle on a side incline.

Another object is to provide latching means in combination with stop means arranged to prevent forward and rearward play of the box while the vehicle is in motion, the stop means being adjustable in the direction of movement of the box for positioning it selectively in a firm abutted latched position.

In carrying out these objectives, an access box is provided which is mass or customed designed for use in pickups, vans, station wagons, etc. It employs a sturdy box and roller assemblies and support members for longitudinal movement relative to the vehicle. The roller support is such that the container is firmly held up in a horizontal rearward position in alignment with its line of travel without ground support, and in such rearward position, articles at the front of the box can be reached by access through the rear opening of the vehicle cargo area. Vertical axis guide roller means are provided which are engageable between the support members and the box to provide lateral stability of the container in its longitudinal positions of movement between forward loaded and rearward access positions. A novel latch and stop arrangement is provided such that in the forward loaded position the stop holds the latch firmly against a forward recess in order to prevent forward and rearward play of the container while the vehicle is in motion. The stop means are adjustable in the direction of movement of the container for positioning the latch selectively against the forward portion of its recess.

The invention will be better understood and additional objects and advantages will become apparent from the following description taken in connection with the accompanying drawings.

BRIEF DESCRIPTION OF THE DRAWINGS

FIG. 1 is a perspective view of a combination access box and bed liner and carrying vehicle, the present invention being applied to such a box;

FIG. 2 is an exploded view of the box and support means therefor apart from the vehicle;

FIG. 3 is an enlarged fragmentary sectional view taken on the line 3—3 of FIG. 2 showing the box and support means as assembled and also showing latch means;

FIG. 4 is a fragmentary elevational view taken on the line 4—4 of FIG. 3 and showing details of the latch means;

FIG. 5 is an enlarged sectional view partly broken away and showing front guide roller means providing lateral stability, this view being taken on the line 5—5 of FIG. 2 but with the box seated on the support; and FIG. 6 is an enlarged fragmentary sectional view, partly broken away and showing rear guide roller means providing lateral stability, this view being taken on the line 6—6 of FIG. 2 and including a portion of the box therein.

DETAILED DESCRIPTION OF PREFERRED EMBODIMENTS

With reference to FIG. 1, a vehicle 10 is illustrated of the type with which the present combination access box and bed liner is applicable. The vehicle shown comprises a pickup truck 10 with which the present invention is particularly useful, although it is to be understood that the invention can as well be used with vans, station wagons, etc. The invention is employed primarily in those instances where the cargo area 12 is covered such as by a canopy 14 on a pickup truck. The numeral 16 represents the rear opening of the cargo area and the numeral 18 represents the conventional tailgate. The numeral 20 in FIG. 3 represents the floor of the cargo area on which the present invention is supported, as will now be described.

With particular reference to FIGS. 1-4, the combination access box and bed liner is designated by the numeral 24 and comprises a bottom wall 26 which is ribbed for strength, side walls 28 and a front wall 30. The top of the side walls has a right angle horizontal extension 32 for longitudinal reinforcement and for concealing latch mechanism to be described. Front wall 30 also has a reinforcing flange 34 on the top thereof and suitable weight reducing recesses 35 in intermediate areas thereof. As designated by the numeral 36, the rearward end of the box is open and comprises an unobstructed opening except for triangular reinforcing webs 38 at the sides. Such webs provide rigidity to the rearward end of the box and yet allow such rearward end to be open for easy access from the rear.

With reference to FIGS. 2 and 3, a support frame for the box on the cargo area floor comprises left and right longitudinal full length support members 40 and 40a, respectively, such as angle irons, secured integrally and rigidly together by cross straps 42. Bracing struts 44 are secured at the sides in a suitable manner to the longitudinal support members 40 and 40a. The straps 42 and the bracing struts 44 are suitably secured to the floor of the vehicle, such as by bolts 46. While it is preferred that the support means 40 and 40a be bolted to the floor of the vehicle so that the access box assembly can be taken out if desired, such support means can be permanently mounted, as by welding, if it is to be a permanent part of the vehicle.

Secured on each of the side walls 28 of the box at a lower portion thereof is a longitudinal rail 50 secured as by bolting to the outer surface of a reinforcing longitudinal recess 52 stamped in the side walls 28 of the box.

Rails 50 have rolling support on a plurality of rollers 56 which are engaged by the bottom of the rail 50 and an upper roller 58 on each side engageable with the top of the rail. Rollers 58 and the rearwardmost rollers 56 provide a cantilevered support of the box in its rearward position, and as will be more fully described, the box is movable into a rearward access position by the support means in horizontal travel and in straight line alignment with its line of travel.

Latch means are provided between the box and its support, and for this purpose, the longitudinal support member 40a has a vertical extension 60 with a plurality of notches or recesses 62 in its top edge. Extension 60 is offset inwardly in a vertical plane above the rail 50 and rollers. Notches 62, FIG. 4, preferably are defined by vertical or square edges 64 and are engageable by a detent 66 supported on the box for manually operable vertical movement More particularly, the detent 66 has guided movement in a housing, 68 of a channel bracket 70 suitably secured to a side wall 28 of the box. The detent 66 is connected to an upright yoke 72 by a cross pin 74 slidably confined in slots 76 in the flanges 68. The detent has spring pressed downward movement by a compression spring 79 engaged between the detent and a projection 80 on the bracket 70 whereby the detent will positively engage the notches when moving along the top edge of the latch extension 60. The notches have a clearance width relative to the width of the detent to insure that the detent will engage therein as it travels on the top edge of extension 60. The square edges of the notches insure a locked engagement of the box in both directions so that the box will be safely locked in all positions even though the vehicle is on an inclined surface.

The upper end of the yoke 72 has a pivotal connection 81 with a crank portion 82 of a latch rod 84 extending to the rearward end of the box and pivotally supported in brackets 86 on the box. Notches 62 are selectively located such that the box is latched in its forwardmost position and also in its rearwardmost position, and with the spring pressed operation of the detent, the box cannot bypass any one of the notches, including the rearwardmost notch unless the latch rod is held in released position. Thus, the box cannot accidentally move rearward of its rearwardmost latched position. In addition, a portion of one or both of the rails 50 at the top edge thereof has a stop block 88, FIG. 2, which is engageable with the front roller 58 rearward of the rearwardmost latched position of the box whereby the box cannot accidentally roll out of its support. For taking out the box it is moved to this abutting position of the blocks against rollers 58 and then tilted up from the rear to clear the blocks 88 from rollers 58 whereby the box can be displaced from its support. In the event of failure of the rear roller assemblies 56 or 58, the box normally could pivot such that its rear end would fall to the ground. However, the offset 61 serves as a safety feature since the rail 50 in such pivoting movement engages up under the offset 61 to stop the box before the front end engaged the ground.

The present invention also incorporates means which provide lateral stability for the box so that the box will not rattle and also so that the box will open and close freely without binding even though the vehicle is parked on an incline with one side higher than the other. For this purpose, front and rear rollers are incorporated in the box and in the support assembly as follows.

As to the front rollers, FIGS. 2 and 5, a screw 90 is threaded in a vertical tapped bore 92 in a forward portion of each rail 50 of the box. These screws project from the rails 50 and form shafts for a roller 94 mounted thereon in an arrangement having edge rolling engagement with the inside surface of the longitudinal support members 40 and 40a when the box is moved longitudinally. When the box is tilted up for removal, rollers 94 will clear the rearwardmost rollers 58 in the same manner that stop blocks 88 clear such rollers.

As to the rear rollers, the longitudinal support members 40 and 40a have an outturned flange 98, FIGS. 2 and 6, on their rearward ends. A vertical shaft or pin 100 is secured as by welding in the inside corner of each of the angled flanges 98. Each shaft carries a roller 102. These rollers project through suitable cut-out portions 104 in the corner of the flanges 98 and supports 40 and 40a and have edge rolling engagement with the vertical side of rails 50. With the rollers on each side at the front and rear and engageable between the box and supports 40 and 40a, the box even though heavily loaded has lateral stability and will roll freely at all times without binding even though the vehicle is parked on a side incline. The box will also be held against side play or rattling while the vehicle is in motion.

The invention also employs means associated with the box 24 to hold it firmly in a non-rattling longitudinal position. To accomplish this purpose, abutment screws 108, FIGS. 2 and 6, are threadedly mounted in a horizontal position in the outwardly turned flanges 98. These screws have head portions 110 arranged to be engaged by the reinforcing webs 38 of box 24 when the box is in a forward position. By suitable adjustment of screws 108, the detent 66, FIG. 4, can be made to fit in the forwardmost notch 62 with the rear edge of the detent in firm engagement with the rearward edge of the notch when the box is pushed firmly forwardly at its forwardmost position. Thus, with the box disposed in its forward traveling position, it is locked tight against longitudinal play. Screws 108 carry locking nuts 112 for suitable adjustment.

According to the invention, a combined access box and bed liner is provided which through its novel support means is arranged to be retracted rearwardly in a horizontal, self-supported position and due to its cantilevered support it will maintain itself in alignment with its line of travel. Thus, ground support is not required at the rearward end when the box is out. The box has an inner latched position and can be latched in any one of the several positions according to location of notches 62. The box cannot accidentally roll rearward unless the latch 84 is manually released, and if the box is to be brought rearward when the vehicle is on an upward incline, it can be safely moved from notch to notch since upon release of the latch 84, the detent 66 will automatically engaged the notches. Thus, unless the latch rod 84 is held in released position the box cannot accidentally roll rearward or forward. Also, it will not become completely displaced from the vehicle since the stops 88 engage the roller 58 after the rearwardmost position of the box. With the box withdrawn to its rearwardmost position, articles in the front thereof can be reached through the rear opening 12 of the vehicle cargo area. Of course, intermediate positions of the box can also be used to conveniently reach articles between the ends. The rearward end of the box being open allows ready removal of articles through this end. Since cargo areas, such as the one illustrated, has rear closures, the rear end of the box is open whereby the closure on the vehicle will close this open end of the box.

The box is held in lateral stable position by the rollers 94 and 102. It will thus ride quietly with the vehicle and in addition will allow the box to roll freely without binding even though the vehicle is parked on a side incline. Also, the box is locked firmly in its forwardmost, traveling position by the abutment screws 108.

As stated hereinbefore, the box is especially adaptable for use with pickup trucks having covers thereon such as a canopy 14. The box is readily withdrawn over the top of the open tailgate and articles can readily be reached from the side of the tailgate through the rear openin of the cargo area. For convenience, a front notch 62, such as the first one rearward of the first notch, locates the rear of the box flush with the rear edge of the open tailgate. The box by means of its ribbed floor and flanged side walls and front wall is structurally strong and durable. It also serves as a liner for the cargo area to protect such cargo area. It may be of narrowed width with relation to the width of the cargo area so that storage areas can be provided between the sides thereof and the sides of the vehicle. The rollers 56 and 58 are protected from side cargo by the upright support members 40 and 40a.

It is to be understood that the forms of our invention herein shown and described are to be taken as preferred examples of the same and that various other changes in the shape, size and arrangement of parts may be resorted to without departing from the spirit of my invention, or the scope of the subjoined claims.

Having thus described our invention, we claim:

1. An access box for vehicles of the type having a covered cargo area with forward and rearward ends defined by a floor and side walls, said access box comprising an open top container including a bottom wall, side walls, a front wall, and a rear reinforcing corner web projecting laterally beyond at least one of said side walls, a pair of laterally spaced, longitudinal support members arranged for securement to the floor of a vehicle cargo area, an outwardly turned flange at the rearward end of at least one of said support members, longitudinal reinforcing rail means on each side of said container, horizontal axis guide rollers on said support members supporting said box above the floor of the cargo area for longitudinal movement between a forward loaded position and a rearward access position, said rail means and rollers providing self support of said box in said movable positions as well as in said rearward access position at a point such that articles in the front thereof can be reached from the rear of the vehicle cargo area, said longitudinal rail means and rollers providing cantilevered and straight line, self support of said box in said rearward access position and in alignment with its line of travel, latch means on said support members and container arranged to locate said container in said forward loaded position and said rearward access position as well as intermediate positions, vertical axis guide rollers engageable between said support members and said container providing lateral stability of said container on said support members in said longitudinal positions of said container between said forward loaded and rearward access positions, said stop means on said outwardly turned flange of said support member engageable with said lateral projecting corner web of said container for stopping forward travel of said container with said latch means in said forward loaded position to prevent forward and rearward play of said container while the vehicle is in motion, said stop means being adjustable in the direction of movement of said container for positioning it selectively to stop said container at precisely the engaged position of said latch in its forward loaded position.

2. The access box of claim 1 wherein said vertical axis guide rollers are at least four in number, a first pair of said rollers being mounted on opposite sides of said container adjacent the front thereof and engageable laterally with said support members to provide said lateral stability and a second pair of said rollers being mounted one on each of said support members adjacent the rear thereof and engageable laterally with said container to also provide said lateral stability.

3. The access box of claim 2 wherein said rail means comprise a reinforcing, longitudinally extending member on each longitudinal extending side wall of said container, said first pair of rollers being mounted on said reinforcing longitudinally extending member and said second pair of rollers being mounted on said outwardly turned flange and being laterally engageable with said reinforcing longitudinal extending members.

4. The access box of claim 1 wherein said longitudinal support members have an upper offset extension on which said latch means is disposed, said offset extension being disposed vertically above said rail means.

* * * * *